Patented Feb. 7, 1939

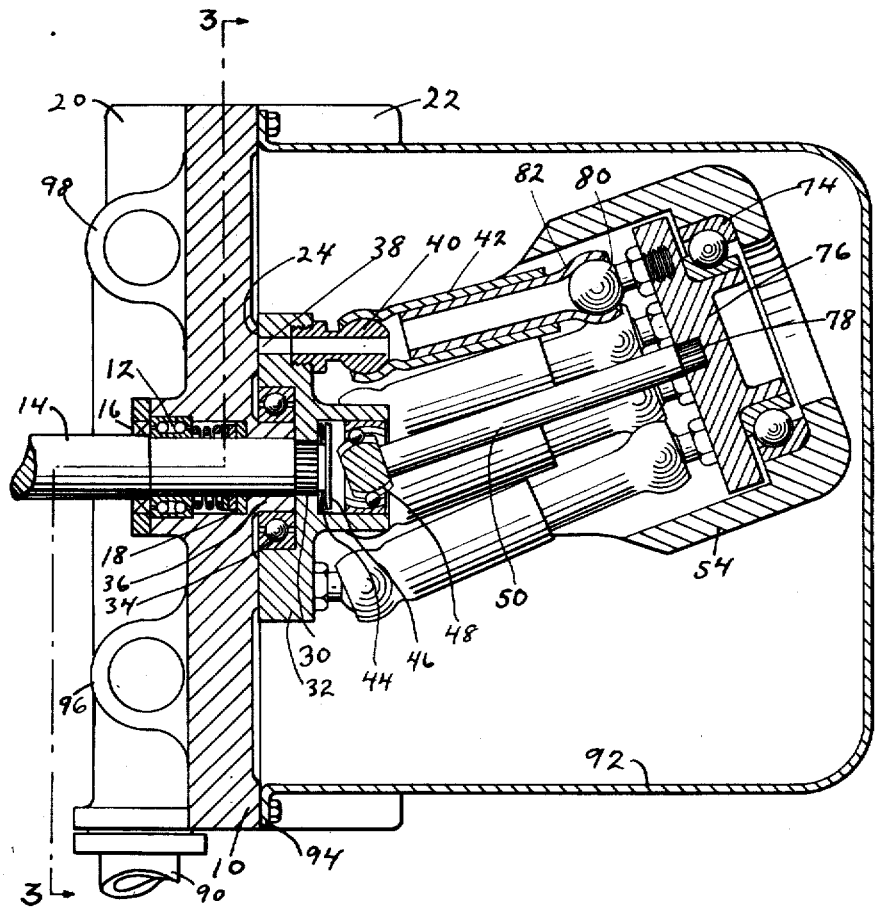

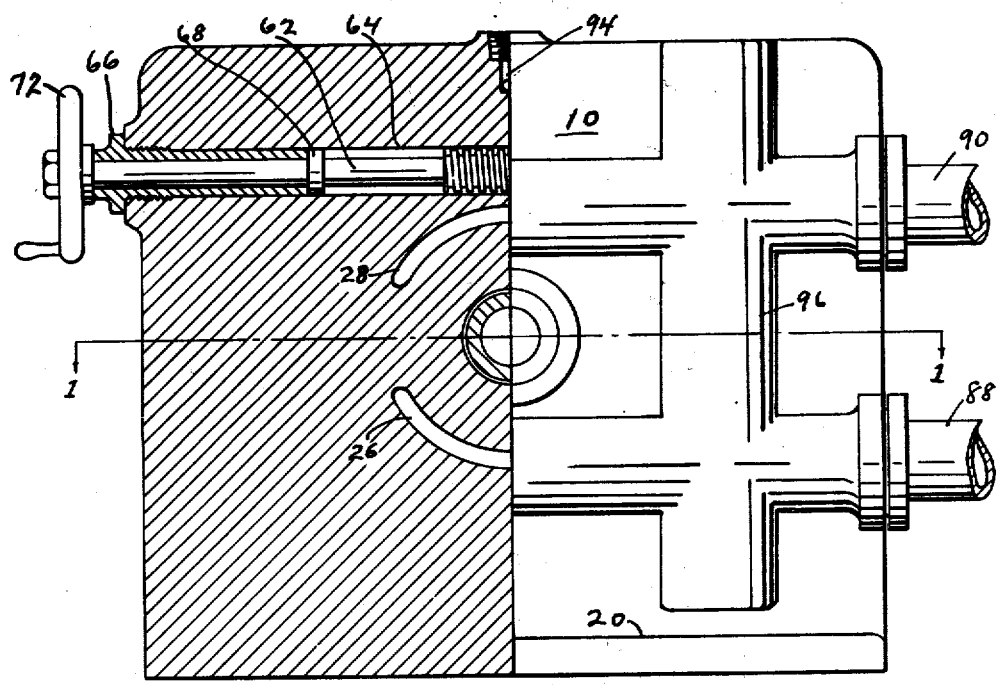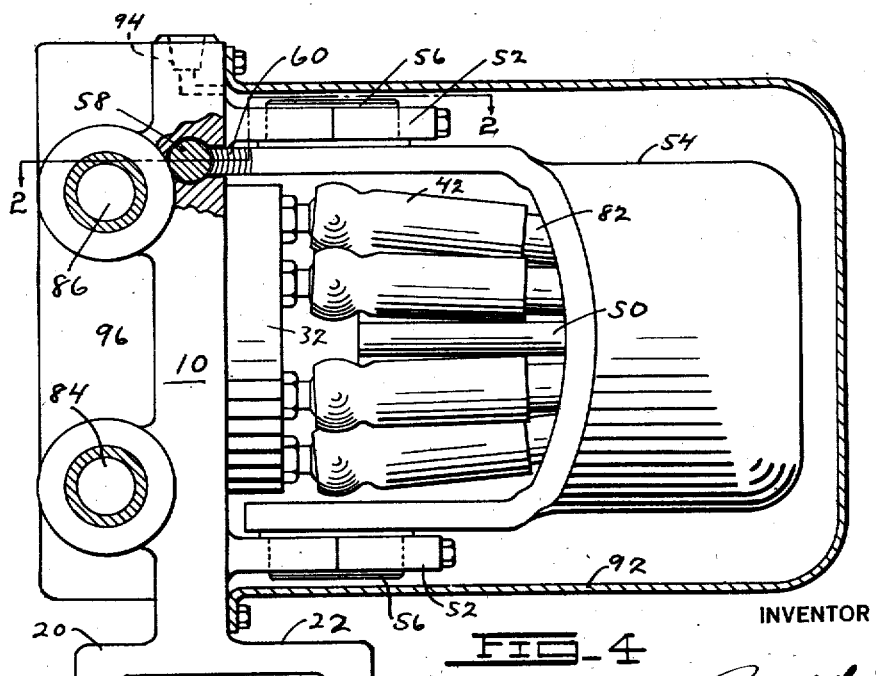

2,146,133

UNITED STATES PATENT OFFICE

2,146,133

POWER TRANSMISSION

Ralph L. Tweedale, Waterbury, Conn., assignor to The Waterbury Tool Company, Waterbury, Conn., a corporation of Connecticut Application June 1, 1936, Serial No. 82,758

8 Claims. (Cl. 103—162)

This invention relates to power transmissions and particularly to those of the fluid type of which a common form comprises generally two or more fluid pressure energy translating devices one of which may function as a pump and another as a motor. One class of apparatus of this character employs a plurality of cylinder chambers and cooperating pistons which are arranged substantially in a circle with their axes lying in a surface of revolution, usually a cylinder. The cylinders are connected together or formed integrally with a cylinder mounting member, while the pistons are articulated to a piston mounting member, the two mounting members being journalled in oppositely facing reaction members for relative rotation between the cylinder and piston mounting members and the oppositely facing reaction members. Reciprocation of the pistons within the cylinders is caused by maintaining one of the reaction members perpendicular to the axis of the surface of revolution on which the cylinder axes lie and maintaining the other reaction member in a plane inclined to such axis, the inclination of which may be varied to vary the stroke of the pistons and consequently the fluid displacement of the device. Valve means, usually of the rotary type, are provided for controlling the admission and exhaust of fluid to and from the cylinders.

In apparatus of this class in which the cylinders and the pistons and their mounting members are bodily rotatable and the reaction members are stationary it is necessary to transmit substantially the entire torque developed or required by the device between the drive shaft and the piston mounting member which is inclined to the axis of the surface of revolution upon which the cylinder axes lie. (The same problem arises in those devices wherein the cylinder and piston mounting members are stationary and it is necessary to take the torque reaction through a universal joint or equivalent mechanism.) One class of devices of this character utilizes a drive shaft mounted on the axis of the cylinder circle, and a universal joint between the drive shaft and the piston reaction member. Considerable difficulty has been experienced with machines of this class in providing a universal joint of sufficient capacity to carry the torque imposed thereon when such a machine is operated at fluid pressures of the order of two thousand pounds per square inch, since the space within which the universal joint must be confined is small. Another class of machines avoids this difficulty by providing a drive shaft on the axis of the piston mounting member and connecting the cylinder mounting member thereto through a universal joint. The load on the universal joint in such constructions is thereby made small, being only the torque required to overcome frictional forces and keep the cylinder mounting member in synchronism with the piston mounting member.

The latter construction, however, presents considerable difficulties in providing for varying the stroke of the pistons by varying the relative inclinations between the cylinder and piston mounting members. The principal difficulty resides in the necessity of conducting the fluid supply and delivery conduits of the device to the valve means associated with the cylinder reaction and mounting members, which are of necessity movable about an axis transverse to the drive shaft. For this reason variable displacement devices in which the drive shaft is coaxial with the piston mounting member have required very complicated and inefficient cored passages for the conduction of fluid to and from the valve mechanism. They have also required packed pivotal joints in the fluid conducting system, which it is obviously desirable to avoid if possible.

It is an object of the present invention to avoid the difficulties of both these classes of fluid pressure energy translating devices while retaining the desirable features of both. Stated briefly, it is an object to provide a fluid pressure energy translating device of the variable displacement type in which the torque load is not transmitted through a universal joint and in which the fluid passages to and from the valve members are simple and direct, avoiding the use of movable joints in the fluid conducting system.

A further object is to provide a fluid pressure energy translating device in which a single plate-like member may form the mounting for the entire mechanism to which may be secured a cup-like closure member forming with the mounting member a closed casing for the entire mechanism.

Further objects and advantages of the present invention will be apparent from the following description, reference being had to the accompanying drawings wherein a preferred form of the present invention is clearly shown.

In the drawings:

Fig. 1 is a horizontal sectional view of a fluid pressure energy translating device embodying a preferred form of the present invention.

Fig. 2 is a fragmentary cross section on line 2—2 of Fig. 4.

Fig. 3 is an end view partly in section on line 3—3 of Fig. 1.

Fig. 4 is a side view of the device, a portion of the casing being broken away showing the interior mechanism.

In the form of the invention illustrated in the drawings a unitary mounting member 10 is provided having bearings 12 on which a drive shaft 14 is journalled, fluid seals 16 and 18 being mounted on either side of the bearings 12. The member 10 is provided with flanges 20 and 22 adjacent its bottom edge forming mounting feet by which the device as a whole may be secured to a suitable base. The member 10 is provided with a raised annular machined surface 24 within the confines of which a pair of arcuate ports 26 and 28 are formed, forming one member of a rotary valve.

The drive shaft 14 carries at its inner end a splined section 30 slidably engaging a cylinder mounting member or plate 32. The plate 32 is carried on a bearing 34 mounted on a tubular projection 36 formed in the member 10 around the shaft 14. The member 32 is mounted to bear against the annular valve surface 24 and is provided with a plurality of individual ports 38 cooperating with the ports 26 and 28. Each port 38 communicates with a hollow spherical pivot member 40 secured to the member 32, each of the members 40 carrying a cylinder sleeve 42 having an interior spherical surface at one end surrounding the spherical surface on the pivot member 40. The member 32 is urged into engagement with the surface 24 by means of a Belleville washer 44 engaging a collar 46 secured to the end of the shaft 14. The member 32 also mounts a universal joint 48 and drives a shaft 50. The joint 48 is illustrated as of the constant angular velocity type shown in Patent #1,665,280.

The member 10 also carries journal bearings 52 near the top and bottom of the plate 10, the axis of the bearings being vertical and perpendicular to the shaft 14 at the center of the universal joint 48 and also passing through the plane of the centers of the spherical pivot members 40. A tilting box 54 has trunnions 56 mounted in the bearings 52 and is pivotally adjustable on its trunnions by means of a worm 58 and segmental worm wheel 60, the latter integral with the tilting box 54. The worm 58 is carried by a shaft 62 mounted in a bore 64 formed in member 10. A bearing sleeve 66 is secured in the outer end of the bore 64 for positioning the shaft 62 by means of a collar 68 and a step bearing 70 at the inner end of the bore 64. A hand wheel 72 is secured to the shaft 62 outside the member 10 for rotating the shaft 62.

The tilting box 54 carries a combined radial and thrust bearing 74 on which is journalled a piston mounting member or plate 76 which is connected to the shaft 50 by a splined connection at 78. The mounting member 76 carries a plurality of pivot members 80 having spherical surfaces on each of which is secured a tubular sleeve 82 telescopingly mounted in the cylinder sleeves 42. The diameter of the spherical surfaces of the pivot members 40 and 80 is preferably substantially equal to the internal diameter of the sleeves 42 and the contact area between the sleeves and the pivot members on opposite sides of the great circle perpendicular to the sleeve axis is so proportioned as to substantially balance the fluid pressure forces acting on the sleeves 42 and 82 respectively.

The member 10 is provided with fluid conduits 84 and 86 communicating with the ports 26 and 28 respectively which may be connected to suitable piping 88 and 90. A cup-like housing member 92 having a flange 94 is bolted to the periphery of the member 10 to form therewith a closed casing which may be supplied with power transmission fluid from a suitable expansion tank through a conduit 94 formed in the member 10. Replenishing and relief valves of any suitable type may be provided in the member 10 which for this purpose is formed with bosses 96 and 98 communicating with the conduits 84 and 86.

The device as thus described is suitable for use in a variable speed power transmission either as a pump or as a motor. Conveniently, the device may be driven by a suitable constant speed prime mover and the conduits 88 and 90 connected to a similar device forming a fluid motor for driving a load machine. The shaft 14 being driven at a constant speed and the mechanism being filled with a suitable power transmission fluid such as lubricating oil, rotation of the shaft 14 causes the mounting members 32 and 76 to revolve, the latter being driven through the universal joint 48. With the tilting box 54 adjusted to a position in which the rotational axis of the member 76 is inclined to the axis of the shaft 14, the telescoping sleeves 42 and 82 are caused to reciprocate relative to each other as the mounting members 32 and 76 rotate. As the ports 38 and the member 32 pass the ports 26 and 28, each of the chambers within the cylinder sleeves 42 will be connected alternately with the supply and return conduits 84 and 86 causing fluid to be withdrawn from the return conduit and delivered to the supply conduit as is well known in pumps of this general class. It will be seen that the amount of reciprocating movement between the sleeves 42 and 82 may be varied by operation of the hand wheel 72 to alter the inclination of the tilting box 54. In this manner the displacement of the pump may be varied from zero, which occurs when the tilting box is perpendicular to the shaft 14, up to maximum in either direction depending upon whether the tilting box is moved to the right or the left from neutral position.

The area of the ports 38 is preferably made such with relation to the area of the cylinders 42 and the surface 24 that the resultant force tending to hold the plate 32 against the surface 24 is very small at the maximum inclination of the tilting box 54. The radial distance to the pivots 40 is preferably greater than that to the pivots 80 in order to bring the center of thrust on the bearing 74 farther toward the center than would be the case if these distances were equal, so that the amount of eccentricity in the load on bearing 74 is thereby reduced.

It will be seen that the load torque is transmitted from the shaft 14 to the cylinder mounting member 32 through the splines 30 so that the universal joint 48 has to carry only the frictional load imposed by the piston mounting member 76. Likewise, the valve ports 26 and 28 are in a stationary member so that the fluid conduits in communication therewith are of simple construction and do not involve the use of movable joints. It is also to be noted that the construction provides a unitary mounting member upon which all the elements of the pump may be attached and to which a closure member may be secured to form a casing for the device. For the purposes of testing the device and particularly with a view to watching its operation, the casing member may be left unattached and the pump may be operated satisfactorily with all parts of the mechanism in full view. The construction also facilitates inspection and repair of the mechanism after it has been placed in service in that it is possible by merely removing the casing 92 to have access to the entire pump mechanism, thus making it unnecessary to disassemble the device as a whole from its mountings or break the shafting or pipe connections. In addition by suitable modification of the mounting means for the device as a whole, the casing member 92 may be omitted and its function preserved by combining it with the frame or other part of a machine tool or other mechanism with which the device may be incorporated.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of means forming a plurality of cylindrical expansion chamber elements having their axes spaced about are axis of revolution, a plurality of piston elements reciprocably mounted to cooperate with said chamber elements, a pair of rotatable members to one of which the expansible chamber elements are articulated and to the other of which the piston elements are articulated, a casing having one member of a rotary valve associated therewith, a second rotary valve member associated with a first one of said pair of rotatable members, a drive shaft journalled in the casing and connected to said first member for conjoint rotation about the shaft axis, a tilting box pivoted on an axis transverse to the shaft and adjacent the plane of articulation of said elements to said first rotatable member for positioning the axis of revolution of said expansible chamber elements at an inclination to the shaft axis, and a universal joint for connecting said rotatable members for rotation together at any position of the tilting box.

2. In a fluid pressure energy translating device of the type in which a plurality of expansible chambers are mounted for rotation between two members one of which is mounted at a variable inclination relative to the other, a unitary mounting means comprising a member forming a main shaft bearing support, ports in the member forming one member of a rotary valve for controlling the admission and exhaustion of fluid to and from the expansible chambers, and means integrally formed on the member forming a pivotal mounting for the variably inclined member about an axis coplanar with the other member, said expansible chambers extending laterally beyond one face of said member, and a cup-like housing surrounding said chambers and secured to said member to form therewith a closed casing.

3. In a fluid pressure energy translating device the combination of a unitary frame member having a central drive shaft bearing, a plate valve surface provided with a pair of arcuate ports, fluid conduit connections communicating with said ports, tilting box trunnion bearings perpendicular to said drive shaft bearing, and mounting lugs, a drive shaft journalled in said drive shaft bearing, a tilting box having trunnions journalled in said trunnion bearings and having a thrust bearing mounted on an axis perpendicular to and intersecting the axis of said trunnions, a first rotating plate secured to said drive shaft for coaxial rotation therewith and having a plurality of spherical pivot joints spaced in a circle about the axis of said drive shaft in a plane including the axis of the trunnion bearings, a second rotating plate rotatably mounted on said thrust bearing and having a plurality of spherical pivot joints spaced in a circle about the axis of said thrust bearing, a constant velocity universal joint drivingly connecting said rotating plates, and telescoping piston and cylinder elements mounted on said pivotal joints, said first rotatable plate being formed with ports communicating between said plate valve surface and the interior of said telescoping piston and cylinder elements.

4. In a fluid pressure energy translating device the combination of a unitary frame member having a central drive shaft bearing, a plate valve surface provided with a pair of arcuate ports, tilting box trunnion bearings perpendicular to said drive shaft bearing, and mounting lugs, a drive shaft journalled in said drive shaft bearing, a tilting box having trunnions journalled in said trunnion bearings and having a thrust bearing mounted on an axis perpendicular to and intersecting the axis of said trunnions, a first rotating plate secured to said drive shaft for coaxial rotation therewith and having a plurality of spherical pivot joints spaced about the axis of said drive shaft in a plane including the axis of the trunnion bearings, a second rotating plate rotatably mounted on said thrust bearing and having a plurality of spherical pivot joints spaced about the axis of said thrust bearing, universal joint means drivingly connecting said rotating plates, and telescoping piston and cylinder elements mounted on said pivotal joints, said first rotatable plate being formed with ports communicating between said plate valve surface and the interior of said telescoping piston and cylinder elements.

5. In a fluid pressure energy translating device the combination of a unitary frame member having a central drive shaft bearing, a plate valve surface provided with a pair of arcuate ports, tilting box trunnion bearings perpendicular to said drive shaft bearings, and mounting lugs, a drive shaft journalled in said drive shaft bearing, a tilting box having trunnions journalled in said trunnion bearings and having a thrust bearing mounted on an axis perpendicular to and intersecting the axis of said trunnions, a first rotating plate secured to said drive shaft for coaxial rotation therewith and having a plurality of spherical pivot joints spaced about the axis of said drive shaft, a second rotating plate rotatably mounted on said thrust bearing and having a plurality of spherical pivot joints spaced about the axis of said thrust bearing, a universal joint drivingly connecting said rotating plates, and telescoping piston and cylinder elements mounted on said pivotal joints, said first rotatable plate being formed with ports communicating between said plate valve surface and the interior of said telescoping piston and cylinder elements, and a cup-like housing member secured to frame member to form therewith a closed casing.

6. In a fluid pressure energy translating device the combination of means forming a plurality of cylindrical expansion chamber elements having their axes spaced about an axis of revolution, a plurality of piston elements reciprocably mounted to cooperate with said chamber elements, a pair of rotatable members to one of which the expansible chamber elements are articulated and to the other of which the piston elements are articulated, a casing having one member of a rotary valve associated therewith, a second rotary valve member associated with a first one of said pair of rotatable members, a drive shaft journalled in the casing and connected to said first member for con-joint rotation about the shaft axis, a tilting box pivoted on an axis transverse to the shaft and adjacent the plane of articulation of said elements to said first rotatable member, for positioning the axis of revolution of said expansible chamber elements at an inclination to the shaft axis, and a universal joint for connecting said rotatable members for rotation together at any position of the tilting box, said casing including a unitary member which provides said one valve member as well as both a bearing support for the drive shaft, and a pivotal support for the tilting box whereby the working parts of the pump may be operatively assembled to a single member of the casing.

7. In a fluid pressure energy translating device the combination of means forming a plurality of cylindrical expansion chamber elements having their axes spaced about an axis of revolution, a plurality of piston elements reciprocably mounted to cooperate with said chamber elements, a pair of rotatable members to one of which the expansible chamber elements are articulated and to the other of which the piston elements are articulated, a casing having one member of a rotary valve associated therewith, a second rotary valve member associated with a first one of said pair of rotatable members, a drive shaft journalled in the casing and connected to said first member for con-joint rotation about the shaft axis, a tilting box pivoted on an axis transverse to the shaft and adjacent the plane of articulation of said elements to said first rotatable member, for positioning the axis of revolution of said expansible chamber elements at an inclination to the shaft axis, a universal joint for connecting said rotatable members for rotation together at any position of the tilting box, said casing including a unitary member which provides said one valve member as well as both a bearing support for the drive shaft, and a pivotal support for the tilting box whereby the working parts of the pump may be operatively assembled to a single member of the casing, and means providing fluid inlet and outlet connections as part of said unitary member.

8. In a fluid pressure energy translating device, the combination of a plurality of cooperating cylinders and pistons, a rotatable mounting member having the pistons articulated thereto in a circular arrangement, a rotatable mounting member having the cylinders articulated thereto in a circular arrangement, means for causing one of said members to rotate in a plane perpendicular to an axis connecting the centers of the circles in which the pistons and cylinders are arranged, means for causing the other of said members to rotate in a plane inclined to said axis, a drive shaft rotatably coupled to the last mentioned member, a rotary valve associated with the last mentioned member, and means for varying the inclination of said axis relative to the last mentioned member and the drive shaft while the angular relation between the last mentioned member and the drive shaft remains fixed.

RALPH L. TWEEDALE.

CERTIFICATE OF CORRECTION.

Patent No. 2,146,133.                  February 7, 1939.

RALPH L. TWEEDALE.

It is hereby certified that error appears in the printed specification of the above numbered patent requiring correction as follows: Page 3, first column, line 25, claim 1, for the word "are" read an; and that the said Letters Patent should be read with this correction therein that the same may conform to the record of the case in the Patent Office.

Signed and sealed this 4th day of April, A. D. 1939.

Henry Van Arsdale (Seal)                Acting Commissioner of Patents.

articulated, a casing having one member of a rotary valve associated therewith, a second rotary valve member associated with a first one of said pair of rotatable members, a drive shaft journalled in the casing and connected to said first member for con-joint rotation about the shaft axis, a tilting box pivoted on an axis transverse to the shaft and adjacent the plane of articulation of said elements to said first rotatable member, for positioning the axis of revolution of said expansible chamber elements at an inclination to the shaft axis, and a universal joint for connecting said rotatable members for rotation together at any position of the tilting box, said casing including a unitary member which provides said one valve member as well as both a bearing support for the drive shaft, and a pivotal support for the tilting box whereby the working parts of the pump may be operatively assembled to a single member of the casing.

7. In a fluid pressure energy translating device the combination of means forming a plurality of cylindrical expansion chamber elements having their axes spaced about an axis of revolution, a plurality of piston elements reciprocably mounted to cooperate with said chamber elements, a pair of rotatable members to one of which the expansible chamber elements are articulated and to the other of which the piston elements are articulated, a casing having one member of a rotary valve associated therewith, a second rotary valve member associated with a first one of said pair of rotatable members, a drive shaft journalled in the casing and connected to said first member for con-joint rotation about the shaft axis, a tilting box pivoted on an axis transverse to the shaft and adjacent the plane of articulation of said elements to said first rotatable member, for positioning the axis of revolution of said expansible chamber elements at an inclination to the shaft axis, a universal joint for connecting said rotatable members for rotation together at any position of the tilting box, said casing including a unitary member which provides said one valve member as well as both a bearing support for the drive shaft, and a pivotal support for the tilting box whereby the working parts of the pump may be operatively assembled to a single member of the casing, and means providing fluid inlet and outlet connections as part of said unitary member.

8. In a fluid pressure energy translating device, the combination of a plurality of cooperating cylinders and pistons, a rotatable mounting member having the pistons articulated thereto in a circular arrangement, a rotatable mounting member having the cylinders articulated thereto in a circular arrangement, means for causing one of said members to rotate in a plane perpendicular to an axis connecting the centers of the circles in which the pistons and cylinders are arranged, means for causing the other of said members to rotate in a plane inclined to said axis, a drive shaft rotatably coupled to the last mentioned member, a rotary valve associated with the last mentioned member, and means for varying the inclination of said axis relative to the last mentioned member and the drive shaft while the angular relation between the last mentioned member and the drive shaft remains fixed.

RALPH L. TWEEDALE.

CERTIFICATE OF CORRECTION.

Patent No. 2,146,133. February 7, 1939.

RALPH L. TWEEDALE.

It is hereby certified that error appears in the printed specification of the above numbered patent requiring correction as follows: Page 3, first column, line 25, claim 1, for the word "are" read an; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.